US010528944B2

(12) United States Patent
Khan

(10) Patent No.: US 10,528,944 B2
(45) Date of Patent: Jan. 7, 2020

(54) SYSTEMS, METHODS, AND COMPUTER READABLE MEDIA FOR CONDUCTING A TRANSACTION USING CLOUD BASED CREDENTIALS

(71) Applicant: MasterCard International Incorporated, Purchase, NY (US)

(72) Inventor: Mohammad Khan, San Jose, CA (US)

(73) Assignee: MasterCard International Incorporated, Purchase, NY (US)

( * ) Notice: Subject to any disclaimer, the term of this patent is extended or adjusted under 35 U.S.C. 154(b) by 1016 days.

(21) Appl. No.: 13/862,968

(22) Filed: Apr. 15, 2013

(65) Prior Publication Data

US 2013/0275307 A1  Oct. 17, 2013

Related U.S. Application Data

(60) Provisional application No. 61/624,127, filed on Apr. 13, 2012.

(51) Int. Cl.
*G06Q 20/40* (2012.01)

(52) U.S. Cl.
CPC ................... *G06Q 20/40* (2013.01)

(58) Field of Classification Search
CPC ............ G06Q 20/3274; G06Q 20/363; G06Q 20/3823; G06Q 30/0255; G06Q 20/3278;
(Continued)

(56) References Cited

U.S. PATENT DOCUMENTS 5,602,377 A  2/1997  Beller et al.
5,796,828 A  8/1998  Tsukamoto et al.
(Continued)

FOREIGN PATENT DOCUMENTS

EP    2 836 971 B1    12/2017
KR   10-2007-0021461    2/2007
(Continued)

OTHER PUBLICATIONS

European Search Report for Application No. 13776039.3 dated Oct. 27, 2015.
Communication of European publication number and information on the application of Article 67(3) EPC for European Application No. 13776039.3 (Jan. 21, 2015).
(Continued)

*Primary Examiner* — Johann Y Choo
(74) *Attorney, Agent, or Firm* — Jenkins, Wilson, Taylor & Hunt, P.A.

(57) ABSTRACT

A method for conducting an electronic transaction that includes initiating an electronic transaction between a mobile device and a POS reader device and applying at least a user identifier that is associated with a user of the mobile device and shared secret data as inputs to a cryptographic function in the mobile device. The method further includes inserting the output of the cryptographic function into legacy transaction formatted data, wirelessly providing the legacy transaction formatted data to the POS reader device via the electronic transaction, forwarding the legacy transaction formatted data to the issuer server, and processing, at the issuer server, the legacy transaction formatted data to verify the user identifier and request authorization for the electronic transaction. The method also includes sending a notification message to the POS reader device that indicates that the electronic transaction is authorized and conducting the electronic transaction upon receipt of the notification message.

19 Claims, 2 Drawing Sheets

(58) Field of Classification Search
CPC .. G06Q 20/202; G06Q 20/407; G06Q 20/352; G06Q 20/401; G06F 21/35; G06F 21/6218; G06F 3/048
See application file for complete search history.

(56) References Cited

U.S. PATENT DOCUMENTS

| | | | |
|---|---|---|---|
| 5,797,470 | A | 8/1998 | Bohnert et al. |
| 6,038,491 | A | 3/2000 | McGarry et al. |
| 6,181,981 | B1 | 1/2001 | Varga et al. |
| 6,233,448 | B1 | 5/2001 | Alperovich et al. |
| 6,295,482 | B1 | 9/2001 | Tognazzini |
| 6,584,309 | B1 | 6/2003 | Whigham |
| 6,658,248 | B1 | 12/2003 | Lee |
| 6,844,813 | B2 | 1/2005 | Hardman |
| 7,028,897 | B2 | 4/2006 | Fernandes et al. |
| 7,127,236 | B2 | 10/2006 | Khan et al. |
| 8,151,345 | B1* | 4/2012 | Yeager ............... G06Q 20/367 235/375 |
| 2001/0034566 | A1 | 10/2001 | Offer |
| 2002/0100798 | A1* | 8/2002 | Farrugia ............... G06F 21/313 235/380 |
| 2003/0055735 | A1 | 3/2003 | Cameron et al. |
| 2003/0169180 | A1 | 9/2003 | Hardman |
| 2003/0169881 | A1* | 9/2003 | Niedermeyer ......... G06Q 20/04 380/258 |
| 2003/0172028 | A1 | 9/2003 | Abell et al. |
| 2005/0059339 | A1 | 3/2005 | Honda et al. |
| 2005/0060062 | A1 | 3/2005 | Walker et al. |
| 2005/0177517 | A1* | 8/2005 | Leung ................... G06Q 20/20 705/64 |
| 2006/0005255 | A1* | 1/2006 | Lipsky ................... G06F 21/10 726/27 |
| 2006/0196931 | A1* | 9/2006 | Holtmanns ........ G06Q 20/3552 235/380 |
| 2008/0147509 | A1* | 6/2008 | Ghosh ................. G06Q 20/045 705/17 |
| 2008/0175393 | A1* | 7/2008 | Oba ..................... H04L 63/062 380/279 |
| 2009/0063345 | A1 | 3/2009 | Erikson |
| 2009/0164322 | A1 | 6/2009 | Khan et al. |
| 2010/0185545 | A1 | 7/2010 | Royyuru et al. |
| 2010/0223186 | A1 | 9/2010 | Hogan et al. |
| 2010/0228668 | A1 | 9/2010 | Hogan et al. |
| 2010/0264211 | A1* | 10/2010 | Jain ....................... G06F 1/1698 235/380 |
| 2011/0211689 | A1* | 9/2011 | von Mueller ........ G06Q 20/085 380/28 |
| 2012/0166311 | A1* | 6/2012 | Dwight .............. G06Q 30/0613 705/26.43 |
| 2012/0232981 | A1* | 9/2012 | Torossian ............... G06Q 30/06 705/14.27 |
| 2013/0041831 | A1* | 2/2013 | Das ....................... G06Q 20/20 705/72 |
| 2013/0091452 | A1* | 4/2013 | Sorden ................... G06F 3/048 715/771 |
| 2014/0025958 | A1* | 1/2014 | Calman ............. G06Q 20/3224 713/189 |

FOREIGN PATENT DOCUMENTS

| | | |
|---|---|---|
| KR | 10-2007-0047264 | 5/2007 |
| KR | 10-2010-0008014 | 1/2010 |
| WO | WO 2009/112793 A1 | 9/2009 |
| WO | WO 2013/155536 | 10/2013 |

OTHER PUBLICATIONS

Notification of Transmittal of the International Search Report and the Written Opinion of the International Searching Authority, or the Declaration for International Application No. PCT/US2013/036665 (Jul. 26, 2013).
"Information Supplement: PCI DSS Tokenization Guidelines Standard: PCI Data Security Standard (PCI DSS)," Security Standards Council (Aug. 1, 2011).
Palgon, "How to Use Tokenization to Reduce the Risk of Data Theft," nuBridges (Jan. 1, 2010).
"ZAPA Technology Chooses ViVOtech to Provide Software Plaform for NFC Mobile Loyalty and Gift Card Services," pp. 1-3 (Nov. 3, 2009).
Notice of Allowance for U.S. Appl. No. 10/323,593 dated Jun. 16, 2006.
Non-Final Office Action for U.S. Appl. No. 10/323,593 dated Dec. 21, 2005.
Non-Final Office Action for U.S. Appl. No. 10/323,593 dated Apr. 11, 2005.
"Information technology—Telecommunications and information exchange between systems—Near Field Communications—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).
Communication pursuant to Article 94(3) EPC for European Patent Application No. 13 776 039.3 (dated Jun. 24, 2016).
Communication under Rule 71(3) EPC Intention to Grant for European Patent Application No. 13 776 039.3 (dated Jun. 22, 2017).
Result of Consultation for European Application No. 13 776 039. 3(Jun. 13, 2017)
Summons to attend oral proceedings pursuant to Rule 115(1) EPC for European Application No. 13776039.3 (Dec. 13, 2016).
Decision to grant a European patent pursuant to Article 97(1) EPC for European Application No. 13776039.3 (dated Nov. 16, 2017).

* cited by examiner

SYSTEMS, METHODS, AND COMPUTER READABLE MEDIA FOR CONDUCTING A TRANSACTION USING CLOUD BASED CREDENTIALS

PRIORITY CLAIM

This application claims the benefit of U.S. Provisional Patent Application Ser. No. 61/624,127, filed Apr. 13, 2012; the disclosure of which is incorporated herein by reference in its entirety.

TECHNICAL FIELD

The subject matter described herein relates to electronic payment and non-payment transactions. More particularly, the subject matter described herein relates to systems, methods, and computer readable media for conducting a transaction using cloud based credentials.

BACKGROUND

Currently, consumers typically conduct the purchase of goods and services at a merchant store by presenting payment at a physical point of sale. In many instances, payment is provided by presenting or swiping a physical magnetic stripe credit or debit card. In some cases, a consumer may alternatively utilize an electronic credit card (i.e., a virtual softcard) that is stored on the consumer's mobile device. Notably, in both of these types of situations, payment card credentials (e.g., credit card related data) are provided to the merchant by the consumer at the point of sale location (e.g., a cash register at the merchant store). However, the need to present payment card credentials may create inconveniences for the consumer and merchant alike in some scenarios. For example, if a consumer fails to carry a physical wallet on his person or neglects to download an electronic payment softcard to a mobile device, the consumer would be unable to conduct a purchase of goods or services due to lack of the proper credentials required to be presented at the point of sale.

Accordingly, in light of these disadvantages, there exists a need for systems, methods, and computer readable media for conducting a transaction using cloud based credentials.

SUMMARY

According to one aspect, the subject matter described herein relates to systems, methods, and computer readable media for conducting a transaction using cloud based credentials. In one embodiment, a method includes initiating an electronic transaction between a mobile device and a point of sale (POS) reader device and applying at least a user identifier that is associated with a user of the mobile device and shared secret data as inputs to a cryptographic function in the mobile device, wherein the shared secret data is a key or password shared by both the user and an issuer server. The method further includes inserting the output of the cryptographic function into legacy transaction formatted data, wirelessly providing the legacy transaction formatted data to the POS reader device via the electronic transaction, and forwarding, from the POS reader device, the legacy transaction formatted data to the issuer server. The method also includes processing, at the issuer server, the legacy transaction formatted data to verify the user identifier and request authorization for the electronic transaction, sending, to the POS reader device, a notification message that indicates that the electronic transaction is authorized and conducting, at the POS reader device, the electronic transaction upon receipt of the notification message.

The subject matter described herein may be implemented in hardware, software, firmware, or any combination thereof. As such, the terms "function", "node", or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for conducting a transaction using cloud based credentials are disclosed. The present subject matter provides a methodology for enabling a consumer identification based transaction to function with existing payment and non-payment transaction networks (e.g., networks for facilitating magnetic stripe transactions and/or EMV card based transactions). For example, the present subject matter may be configured to associate a consumer with a payment or non-payment card without requiring plastic magnetic stripe card credentials or EMV card credentials to be present at the point of sale (e.g., on the consumer's or customer's person). Specifically, the present subject matter may enable a consumer to initiate a payment or non-payment transaction at a point of sale without carrying a card based instrument or associated credentials. Instead, the present subject matter may utilize a consumer's card credentials that are stored in the cloud or links to the payment instrument residing in the cloud by accessing either a POS driven network or a consumer mobile device network. As used herein, the term "cloud" is intended to mean one or more backend servers existing in a network that is supported by (e.g., accessible via) the Internet and/or a mobile network. Not only is the present subject matter convenient for a consumer user, but such a methodology enables a card issuing entity to offer a non-card based transaction option to its registered users at a point of sale (e.g., a traditional attended or unattended check-out locations in a merchant store). The present subject matter may also be utilized using a mobile point of sale, such as a mobile checkout within a store or home deliveries/purchases (e.g., pizza delivery). Notably, the present subject matter leverages an existing card based point of sale, payment network, and processing infrastructure. For example, the present subject matter may utilize existing Track 1, Track 2, ISO BIN ranges, PIN pad, and POS based infrastructures. In one embodiment, the cloud based payment is directly linked to a payment or non-payment account (e.g., a prepaid payment account) associated with a consumer user. Similarly, the cloud based payment may also be linked to an existing card based payment or non-payment account where card credentials are stored in the cloud (e.g., in a backend server).

Figure 1:
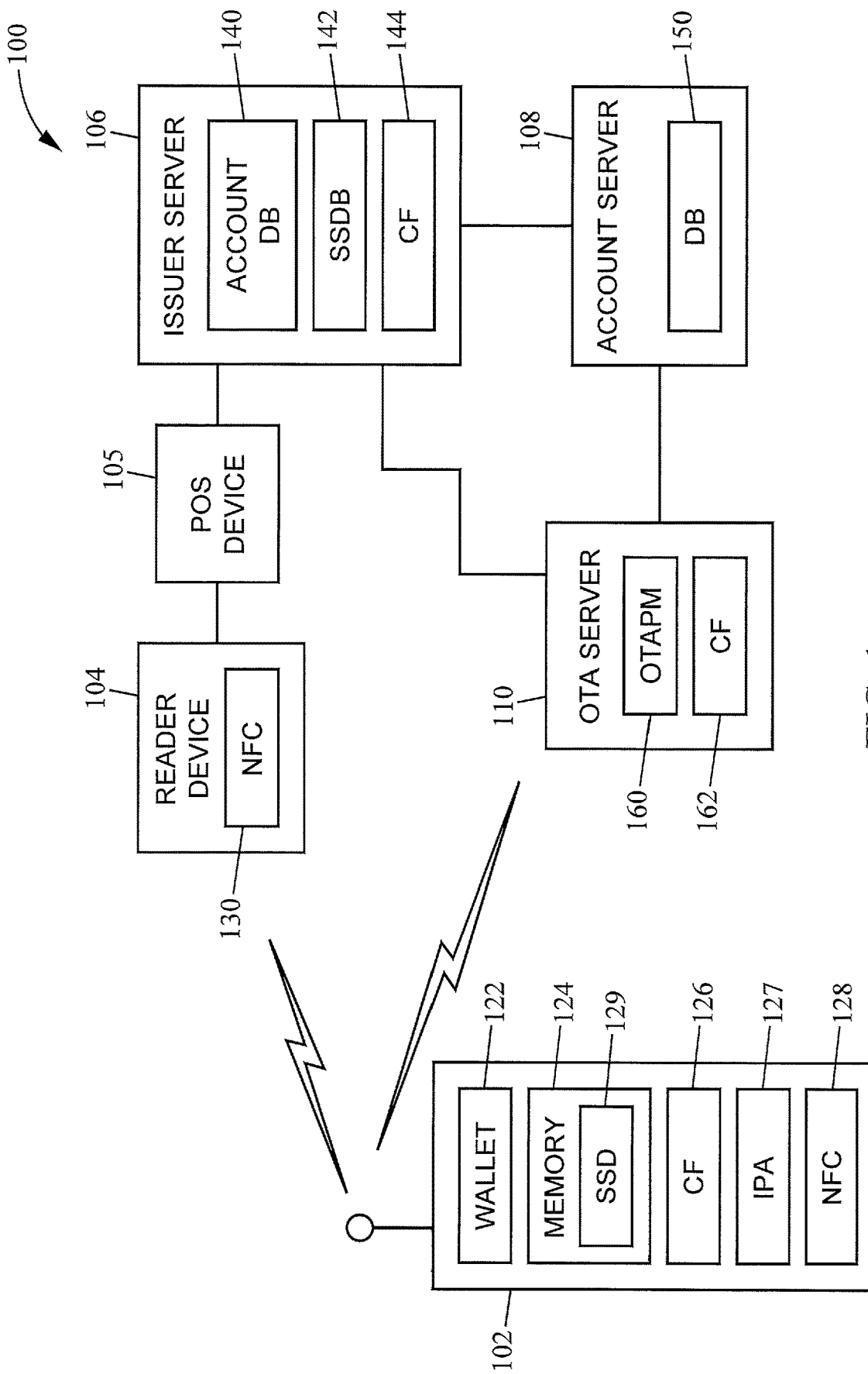
FIG. 1 is a block diagram illustrating an exemplary system for conducting a transaction using cloud based credentials according to an embodiment of the subject matter described herein.

FIG. 1 depicts an exemplary system 100 that includes a mobile device 102, a reader device 104, a point of sale (POS) device 105, an issuer server 106, an account server 108 and an over the air (OTA) provisioning server 110. In some embodiments, mobile device 102 may comprise a smartphone, a personal digital assistant (PDA), a tablet computer, or any other portable computing device. In some embodiments, mobile device 102 may include a near field communications (NFC) module or chipset 128, a mobile wallet application 122, a memory module 124, a cryptographic function 126, and one or more electronic softcard applications (e.g., issuer purchase application 127). Each of these elements is described in greater detail below. Although FIG. 1 depicts a purchase application other applications, such as a non-payment application, may be utilized without departing from the scope of the present subject matter.

In one embodiment, mobile wallet application 122 includes a software based application that may be configured to manage and utilize the one or more electronic softcard applications. An exemplary application or softcard includes an electronic payment card like an electronic/virtual credit card, debit card, or prepaid card. Similarly, an application or softcard may also include electronic/virtual non-payment cards, such as an electronic loyalty card, healthcare card, membership card, or the like. One exemplary softcard includes an issuer purchasing application (IPA) 127 (e.g., a MasterCard softcard). Additional examples of applications or softcards include electronic coupons, electronic loyalty cards, electronic offers, electronic payment cards, electronic credit cards (open loop and/or closed looped), electronic event or ride tickets, electronic rewards, a digital receipt, a payment identifier, a boarding pass, an electronic check-in identifier, an electronic hotel key, a membership card/key, an electronic gift card, an electronic prepaid card, an electronic business card, and the like.

In one embodiment, mobile device 102 may be a near field communications (NFC) enabled mobile device that may be used to conduct an electronic transaction via an NFC tap. For example, mobile device 102 include NFC module 128, which may include any circuit component that enables mobile device 102 to communicate with passive NFC enabled devices (e.g., an unpowered NFC smart tag) or active NFC enabled devices (e.g., a powered NFC wireless reader) via NFC. In some embodiments, NFC module 128 may be configured to enable mobile device 102 to communicate via a peer-to-peer mode (ISO 18092) or a card emulation mode (ISO 14443). Mobile device 102 may also be equipped with a Quick Response (QR) code reader, a barcode reader, a camera, a BLUETOOTH™ enabling chip, a WiFi enabling chip, and/or another wireless technology enabling chip.

Referring to FIG. 1, reader device 104 may include a point of sale (POS) reader device. As used herein, the term point of sale is intended to generally describe a location where purchase transactions and non-purchase electronic transactions are conducted. In some embodiments, reader device 104 may be located at a store, a taxi cab, a vending machine, a kiosk, and the like. Notably, reader device 104 may include a NFC module or chipset 130 that enables reader device 104 to communicate via NFC. For example, NFC module 130 may communicate with NFC module 128 when mobile device 102 is brought into close proximity and interfaced (e.g., NFC tapped) with reader device 104. In some embodiments, reader device 104 is communicatively connected (wired or wireless) to a point of sale terminal device 105. The terms "tap," "NFC tap," and "interface" can be used to mean the same actions. As used herein, the terms "tap" and "NFC tap," (in reference to NFC-enabled devices and wireless transceivers such as device readers or NFC passive tags) means to provide a close or near field interface between an NFC-enabled device and a wireless transceiver.

In one embodiment, point of sale (POS) device 105 may include any one of a point of sale terminal device (e.g., a cash register), a point of service terminal device, a point of interaction (POI) terminal device, a banking terminal device, an automatic teller machine (ATM) terminal device, and the like. POS device 105 may be configured to communicate with one or more issuing entities (such as issuer server 106) via an IP network, a cellular/wireless network, or a leased/dedicated line using web services, XML, or a proprietary application programming interface (API).

In one embodiment, issuer server 106 may include a customer mobile application or softcard issuer server associated with a service provider system. For example, issuer server 106 may be configured to manage and generate softcards issued to consumer users by maintaining an account database 140, a shared secret database 142, and a cryptographic function 144. Each of these elements is described in greater detail below. In one embodiment, issuer server 106 may also utilize a hardware or software based security system to issue applications or softcards to consumers in a secure manner. In one embodiment, issuer server 106 may include an issuer server that is associated with an application issuer or merchant, or with a third party acting on behalf of either the issuer (managed service) or as part of outsourced services (ASP/SaaS).

Account server 108 may include an account issuance and management server that may include an account fund management engine to operate a billing system and maintain existing accounts. In some embodiments, account server 108 may maintain a local database 150 that is configured to maintain account information associated with identified account holders (e.g., consumers).

OTA provisioning server 110 is a network element that is communicatively connected to issuer server 106, account server 108, and mobile device 102. In one embodiment, OTA provisioning server 110 may be may be equipped with an OTA provisioning module that enables server 110 to communicate with mobile device 102 using WiFi, cellular/wireless communications (e.g., 3G, 4G, long term evolution (LTE), etc.), or any other emerging wireless communications. In some embodiments, OTA provisioning server 110 may include a cryptographic function 162.

As indicated above, system 100 may be utilized to enable a consumer to conduct a payment or non-payment transaction without requiring plastic magnetic stripe card credentials or EMV card credentials to be present at the point of sale. In one embodiment, a consumer (e.g., mobile device user) may utilize mobile device 102, which is provisioned with a supported softcard or application 127 (e.g., from a retailer, from a service provider, or from companies supporting cloud based payments, like Google, Paypal, Mastercard, etc.), at a point of sale register to initiate a purchase transaction of one or more items. Although the following example describes a purchase and/or payment transaction, other types of electronic transactions (e.g., a non-payment transaction or a combination of a payment and non-payment transactions) requiring credentials may be conducted without departing from the scope of the present subject matter. For example, the electronic transaction being conducted may include at least one of a loyalty transaction, a coupon redemption transaction, an offer redemption transaction, a digital receipt pickup transaction, an electronic coupon pickup transaction, an electronic coupon pickup transaction, a reward pickup transaction, a one-touch checkout transaction, an order transaction, and a non-payment transaction. Other exemplary electronic transactions includes a combination of payment and non-payment transaction, an electronic certificate delivery transaction, a printing advice transaction, an access control transaction, a boarding pass transaction, and an electronic certificate redemption transaction.

Initially, a new or existing account holder (i.e., the consumer user) may download an application or softcard, such as application 127, from an online application store or server. Upon its initial use, application 127 may establish a secret shared data with an issuing system (e.g., issuer server 106) via a cellular or Internet network. In some embodiments, application 127 may also include an issuer digital certificate that enables application 127 and issuer server 106 to mutually authenticate each other for the entire life management cycle of application 127. The issuer digital certificate also enables application 127 and issuer server 106 to mutually authenticate for a payment transaction (e.g., when NFC is utilized).

In some embodiments, mobile device 102 may communicate with issuer server 106 to conduct a personalization and/or registration phase. If the user of mobile device 102 is a new account holder, then mobile device 102 may be utilized to provide an international mobile equipment identity (IMEI) number, a user name, an email address, and a password to issuer server 106. In one embodiment, the IMEI number is automatically provided to issuer server 106 by application 127 while the name, email address, and password are entered by the user (e.g., via key entry or voice to text). Alternatively, if the user of mobile device 102 is an existing account holder, then mobile device 102 may be utilized to provide an IMEI number, an existing account number, an email address, and a password to issuer server 106. In one embodiment, a challenge and response session may also be conducted to provide personal information from the user to issuer server 106. In one embodiment, the IMEI number is automatically provided to issuer server 106 by application 127 while the account number, email address, challenge responses, and password are entered by the user (e.g., via key entry or voice to text). Regardless of the status of the user, issuer server 106 may store the received data from mobile device 102 in local databases for future verification purposes.

In both of these scenarios, issuer server 106 may communicate with mobile device 102 to provide data that includes an alternative account number (e.g., a user identifier), application secret data that is not made visible to the account holder/user, a unique transaction value (with or without an associated identifier number) for the next "n" number (e.g., 5 to 10) of "no air signal" transactions (e.g., electronic transactions being conducted at the point of sale but mobile device 102 cannot communicate with issuer server 106 to receive a unique transaction value or sequence number in real time). The information provided by issuer server 106 may be stored by mobile device 102 in memory 124. Memory 124 may include a secure element or baseband memory.

After conducting the registration phase, a user may subsequently utilize the data provided by the issuer server to conduct an electronic transaction using cloud based credentials. In one embodiment, mobile wallet 122 may be used by a user to select and launch application 127. The user may also be able to select a "cloud payment option" provided by application 127 by selecting a cloud icon on the mobile phone screen display and subsequently providing a password, for example. After the password is entered, application 127 may direct mobile device 102 to establish a real-time connection to issuer server 106 in order to immediately obtain a unique transaction value (UTV), e.g., a sequence number. In the event a wireless or cellular signal is not available within a designated period of time (e.g., 1 second), application 127 may utilize a UTV stored in memory 124.

At this time, application 127 may create or initiate a cryptographic function 126, which may apply at least one user identifier and shared secret data (e.g., security key data) as input. In one embodiment, cryptographic function 126 may include at least one of a one way function, a cryptographic hash function, a standard encryption function, or proprietary encryption function. The exact type of cryptographic function to be utilized in a given embodiment is typically agreed upon by the issuer entity (or group of issuers) and mobile wallet 122 (and/or application 127). In one embodiment, the password, user/consumer identifier, and consumer personal device identifier may each be utilized by cryptographic function 126 with the following two different example approaches. In a first approach, if there is no shared secret or public key available in mobile device 102, then the password is used as the main input data for generating an encryption key while the user/consumer identifier, consumer personal device identifier, sequence number, and/or a random number are the main contributors/elements to the data that is encrypted using 3-DES or AES as part of cryptographic function 126. In a second approach, if there is a shared secret or public key mechanism stored in mobile device 102, then the password, user/consumer identifier, consumer personal device identifier, sequence number and/or random number are all part of the data to be encrypted as part of cryptographic function 126. Notably, cryptographic function 126 is identical to at least one of a cryptographic function 144 stored on issuer server 106 or cryptographic function 162 on OTA provisioning server 110.

In some embodiments embodiment, cryptographic function 126 may utilize one or more user identifiers (or identifiers associated with a user) as input. User data content may include an account number associated with a service provider, a unique user identifier (e.g., a phone number, email address, national identifier, etc.), a user password (in combination with optional biometric information in some instances), a subscriber identity module (SIM) identifier, an employer identification number (EIN), a WIN, an international mobile equipment identity (IMEI) number, a random number, and/or a unique transaction value (e.g., a sequence number). In one embodiment, the user identifier is mapped to a mobile device identifier (e.g., a serial number or an IMEI number) or a SIM identifier. In some embodiments, cryptographic function 126 may also be configured to utilize shared security data as input. In some embodiments, the security key data input may be based on i) the user password, ii) a shared key, (iii) a public key, a combination thereof, or any other type of encryption/decryption key. For example, the security key may be shared secret data that is known by both the user of mobile device 102 (or securely stored on mobile device 102) and issuer server 106.

In one embodiment, application 127 may utilize cryptographic function 126 to produce an output that may be used to authorize a purchase payment (or some other electronic transaction) at the point of sale. In one embodiment, cryptographic function 126 may receive an IMEI number, an account number, a UTV number (either stored in memory 124 or received in real time), and hash data to generate an output that is formatted as legacy transaction formatted data (e.g., Track 1 and Track 2 data or EMV data). Application 127 may also build a 3-DES key based on the entered password and the previously provided application secret data. In one embodiment, a part of the output of cryptographic function 126 is turned into Track 1 and Track 2 data (e.g., hexadecimal characters). At this point, the output of cryptographic function 126 is ready for transmission to reader device 104 when mobile phone 102 is interfaced (e.g., NFC tapped) with reader device 104. In one embodiment, at least a portion of the user identifier and a BIN remains unencrypted (i.e., in the clear) while the remaining data is encrypted as output of cryptographic function 126.

In one embodiment, the output of cryptographic function 126 in mobile device 102 is formatted in accordance with the Track 1 and Track 2 (T1/T2) data format. Although the following description details the use of T1/T2 formatted data, any of the abovementioned legacy transaction formatted data may be utilized without departing from the scope of the present subject matter. For example, the output data may also be formatted in accordance with the EMV data format or a payment Form Fill out format. The account number, consumer identifier (i.e., user identifier), and password (along with other information/data) may be applied to cryptographic function 126 as inputs. The security key (mentioned above) may also be included as input for cryptographic function 126 as a means to encrypt the output of cryptographic function 126. As a result, the output of cryptographic function 126 includes encrypted data that is contained, converted or mapped in the format of Track 1 and Track 2 data.

In some embodiments, in the event a consumer user forgets his password, issuer server 106 may request one or more personal questions to be answered. The answers to these personal questions may be originally provided by the user during the registration process (e.g., where were you born, what was your first car model, etc.). If the personal question(s) is answered, issuer server 106 may send a text message to a phone number designated by the user with one time password to be entered before establishing a new password. Once the data is outputted from cryptographic function 126, it is included in T1/T2 formatted data. For example, the Track 1 portion of the output may designate or allocate the first 6 digits for an ISO bank identification number (BIN) or issuer identifier number (IIN). Up to 12 digits of the Track 1 format may be utilized for an alternative account number and 19 digits may be allocated for discretionary data (e.g., designated to hold part 2 of the output of cryptographic function 126). Similarly, the Track 2 portion of the output may also designate or allocate the first 6 digits for the ISO BIN or IIN. Up to 12 digits of the Track 2 format may be utilized for an alternative account number and 10 digits may be allocated for discretionary data (e.g., designated to hold part 1 of the output of the one way function). In one embodiment, the first 6 digits (e.g., most significant value) associated with the account number/identifier may be encrypted while the last 6 digits are left alone. The unencrypted 6 digits (e.g., ISO BIN range) allow an issuer server to access an account based on the account number and a user/consumer identifier without requiring access to a key. The first 6 digits may be encrypted by the password, public key, or shared key.

The present subject matter allows a secured payment or any other application transaction to be accepted by a merchant or a third party service provider without requiring any secured payment card credential/token present at the point of sale/transaction (e.g., stored securely in possession of a user or the user's mobile device). The present subject matter also allows a payment or other application transaction to be authorized/settled between a user and a service provider (e.g., issuer server 106) directly using a shared secret data (that is known to the user) that is shared between a user and a service provider, and can be easily entered on mobile device 102 at the time of transaction. For example, a user is able to pay for an item at a physical merchant point of sale (POS) location, point of service location, or point of transaction location, by entering a password on his/her mobile device 102 and interacting/interfacing mobile device 102 with reader device 104 at the POS (e.g., a wireless device reader located at the POS), where mobile device 102 sends the output data of cryptographic function 126 in a specific format (e.g., a legacy transaction data format) to reader device 104. Notably, data sent to reader device 104 is produced using cryptographic function 126 based on a user identifier, password, personal device identification data in encrypted manner in a legacy transaction data format that can be carried through existing networks (e.g., such as a legacy issuer authorization network and/or legacy transaction network) with requiring little or no change in the data format. The specific data formats for the legacy transaction formatted data include, but are not limited to, i) Track 1, Track 2, and Track 3 data format for physical POS payment networks, ii) Europay, MasterCard, and Visa (EMV) payment data format for physical POS payment networks, and iii) a payment form fill out format for an online purchase network/system.

After generating the legacy transaction formatted data (e.g., T1/T2 formatted data), mobile device 102 may wirelessly provide the legacy transaction formatted data to reader device 104 at the point of sale (i.e., a POS reader device) via NFC. For example, mobile device 102 may provide the T1/T2 formatted data (which includes the output of cryptographic function 126) to reader device 104 that is associated with a point of sale (POS) device 105. In one embodiment, POS device 105 is either located at a fixed location or includes a mobile POS reader device. In some embodiments, reader device 104 may be a QR code reader, a barcode reader, an NFC peer-to-peer (P2P) reader, or the like. Specifically, reader device 104 at the point of sale may receive the T1/T2 formatted data from mobile device 102 and may subsequently forward the T1/T2 formatted data to issuer server 106 via POS device 105 (e.g., a cash register) over the existing POS infrastructure (e.g., legacy POS terminals, merchant processing network, POS rails, or any other network entity that typically facilitates the processing and delivery of T1/T2 data received from a credit card swipe, for example) to an issuer server associated with one or more service providers (e.g., card issuing entity). In one embodiment, issuer server 106 may be a backend server positioned in the cloud of a legacy issuer authorization system.

In an alternative embodiment, the T1/T2 formatted data may be wirelessly provided by mobile device 102 to an extra hop device via WiFi/GPS/BLUETOOTH™/cellular detection or any other auto detection method. The alternate device may then forward the T1/T2 formatted data to POS device 105. Also, mobile device 102 may be configured to tap a smart poster which directs mobile device 102 to provide the T1/T2 formatted data with a merchant server on the backend. The merchant server may then forward the T1/T2 formatted data to POS device 105 which subsequently provides the data to issuer server 106 over the existing POS rails.

In some embodiments, issuer server 106 is configured to identify and verify a user/consumer identity using the received T1/T2 formatted data. Notably, issuer server 106 may be provisioned with shared secret data that was shared with the user of mobile device 102. The shared secret data may be a password, the public key, or a shared key. In one embodiment, issuer server 106 receives and parses the T1/T2 formatted data to obtain the unencrypted user identifier, which is subsequently used to query a shared secret database 142. In some embodiments, shared secret database contains entries that map user identifiers with shared secret data (e.g., passwords, encryption keys, security keys, etc.). Using the user identifier, issuer server 106 may obtain an appropriate shared secret data that can be used to decrypt the received T1/T2 formatted data. After decrypting the T1/T2 formatted data, issuer server 106 may use the user identifier to query an account database 140 to locate stored information associated with the consumer user. Notably, issuer server 106 may compare the decrypted data with the located information stored in database 140 to verify the identify the user. If the decrypted data received in the T1/T2 formatted data matches the database information, then issuer server 106 is able to verify the identity of the consumer user.

In one embodiment, issuer server 106 decrypts a portion of the legacy transaction formatted data using a copy of the shared secret data that is stored locally in a database in issuer server 106. Issuer server 106 may then compare the portion of the legacy transaction formatted data with stored user information (in database 140) in issuer server 106 to verify the identity of the user. If the identity of the user is verified, issuer server 106 may be configured to determine if card credentials (stored in account server 108) associated with the user are valid and thus, can be used to complete the electronic (purchase) transaction. In one embodiment, a user identifier is linked to card credentials stored in account server 108 wherein the card credentials comprise data that include magnetic stripe card data or EMV payment card data In an alternate embodiment, issuer server 106 may receive the T1/T2 formatted data and utilize its own cryptographic function 144 based on a locally stored copy of the shared secret data and user related information (which are used as input). For example, after the shared secret data (along with other stored information such as a user identifier, consumer personal device identifier, UTV number, random number, and/or a unique issuer code) is inputted into cryptographic function 144 residing in issuer server 106, issuer server 106 may then compare the encrypted output of the card issuer server's cryptographic function with the information included in the received encrypted T1/T2 formatted data originating from mobile device 102. If a match exists, then the consumer user identity is positively verified. In an alternate embodiment, OTA provisioning server 110 may be configured to use cryptographic function 162 to perform the decryption task instead of issuer server 106.

In some embodiments, issuer server 106 may process a password included in the received T1/T2 formatted data to verify the consumer identity. In a first embodiment, the password may be utilized by mobile device 102 to function as part of a security key to encrypt data. In such a case, the password is already known to issuer server 106. The password may include or utilize an alphanumeric password, biometric data, or a challenge/response mechanism. In a second embodiment, issuer server 106 and mobile device 102 are equipped with a shared secret key (e.g., 3-DES) that may be used to verify the consumer identity. In a third embodiment, issuer server 106 or associated entity has provided a public key to mobile device 102 that may be used to verify the user/consumer identity. In the first embodiment, the password is used as a key to encrypt the contents of the cryptographic function, while in the second and third embodiments, the password is included as a part or portion of the contents of the cryptographic function. In one embodiment, issuer server 106 links the user identifier to an application account (e.g., a credit card account, a debit account, or a prepaid financial account) that is associated with the application selected to conduct the electronic transaction at the point of sale. In one embodiment, the application account may be stored in database 150 in account server 108.

Once the user/consumer verified and the account credentials are validated, issuer server 106 provides an instruction (e.g., a confirmation or notification message) to POS device 105 and/or wireless device reader 104 to proceed with the electronic transaction (i.e., authorize the electronic transaction at the POS). In one embodiment, the instruction is provided via OTA provisioning server 110. POS device 105 may then conduct/complete the electronic transaction upon receipt of the notification message.

Figure 2:
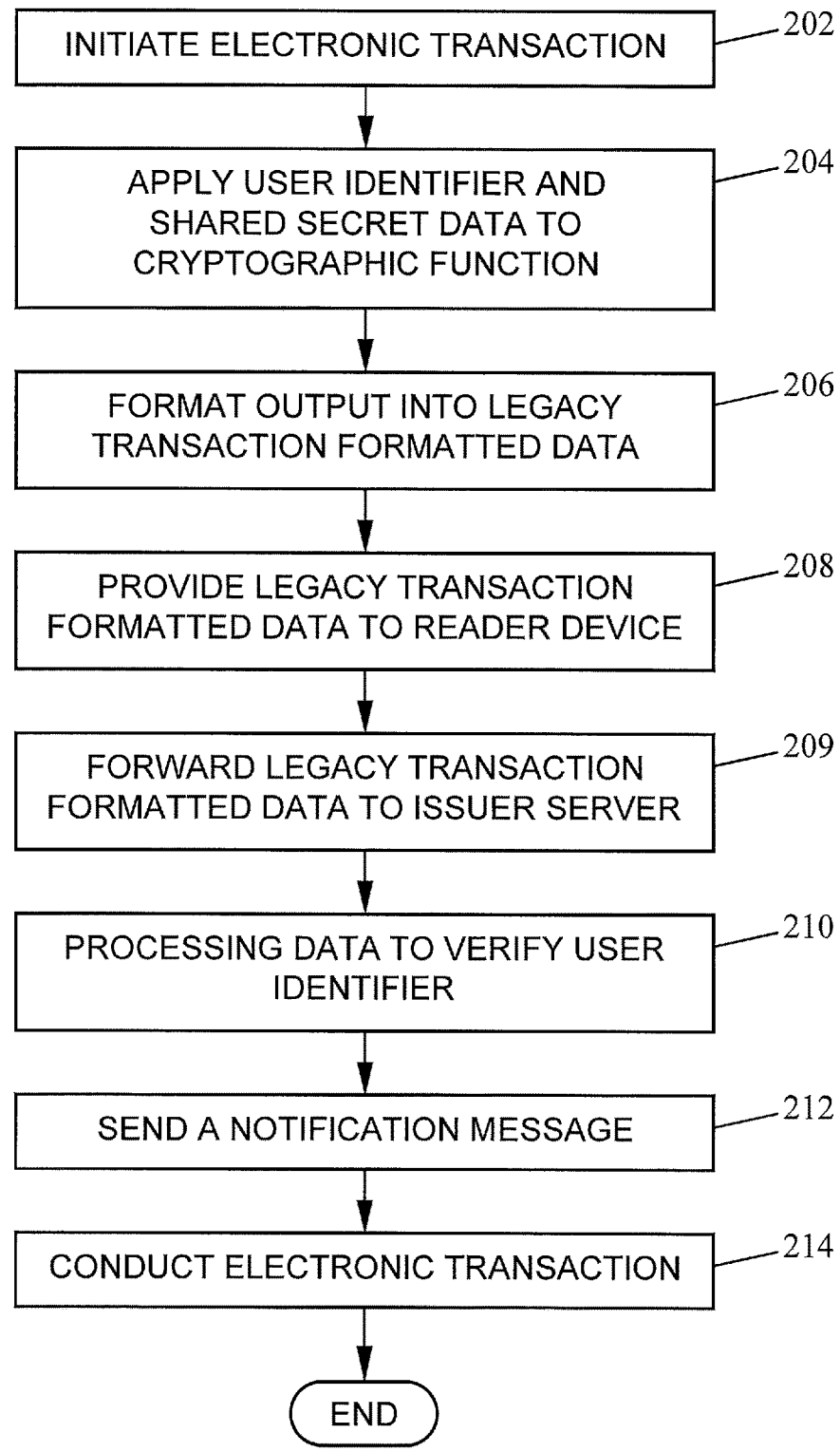
FIG. 2 is a flow chart illustrating an exemplary process for conducting a transaction using cloud based credentials according to an embodiment of the subject matter described herein.

FIG. 2 is a flow chart illustrating an exemplary method 200 for conducting a transaction using cloud based credentials according to an embodiment of the subject matter described herein. In step 202, an electronic transaction is initiated. In one embodiment, a user of a mobile device uses a mobile device to select and launch an application (e.g., utilize a mobile wallet to select a softcard). After selecting an application, the user may enter shared secret data (e.g., a password or encryption key known by both the user and the issuer entity) associated with the application using the user interface (e.g., touch screen or keys) of the mobile device.

In step 204, a user identifier and shared secret data is applied to a cryptographic function. In one embodiment, the mobile device may utilize the shared secret data provided by the user as input for a cryptographic function included in the mobile device. In addition, the mobile device may also utilize a user identifier (e.g., an account number associated with the selected application) as input into the cryptographic function. In some embodiments, additional identifiers associated with the user that may also be used as input for the cryptographic function include a SIM number, an EIN, a WIN, an EMEI number, and a unique transaction value. In one embodiment, the mobile device may wirelessly communicate in real time with an issuer server to obtain a unique transaction value associated with the impending transaction or may utilize a previously received UTV that is currently stored in the mobile device.

In step 206, the output of the cryptographic function is formatted into legacy transaction formatted data. In some embodiments, the output of the cryptographic function is formatted into Track 1 and Track 2 (T1/T2) format. Alternatively, the output of the cryptographic function may be formatted into EMV format. Notably, the output may be formatted such that the BIN and at least one user identifier remains unencrypted. Notably, an unencrypted BIN number and a user identifier may allow the output data (in T1/T2 format) to be routed to an appropriate issuer server (associated with the BIN) using the existing POS and payment network infrastructure.

In step 208, the legacy transaction formatted data is provided to a reader device. In some embodiments, the mobile device communicates the output data of the cryptographic function wirelessly to an NFC enabled reader device via an NFC tap. Upon receiving the legacy transaction formatted data (i.e., the output data), the reader device may forward the data to a point of sale device (e.g., where the reader device is a separate device from the point of sale device as shown in FIG. 1).

In step 209, the legacy transaction formatted data is forwarded to an issuer server. In some embodiments, the POS device forwards the legacy transaction formatted data to an issuer server identified by the BIN number included in the data.

In step 210, the legacy transaction formatted data is processed to verify the user identifier. In some embodiments, the issuer server processes the received legacy transaction formatted data (e.g., in Track 1 and Track 2 format) by decrypting the legacy transaction formatted data using locally stored shared secret data (i.e., shared secret data associated with the user identifier stored at the issuer server). In one embodiment, the issuer server may use the user identifier to access a shared secret database to obtain appropriate shared secret data, such as a password or encryption key. The shared secret data may then be used by the issuer server to decrypt the legacy transaction formatted data. Afterward decrypting the received data, the issuer server may compare the decrypted data with the stored information in an account database to verify the user.

In an alternate embodiment, the issuer server utilizes a local cryptographic function that is similar to the cryptographic function utilized by the mobile device. For example, the issuer server may insert the same input into its own cryptographic function (e.g., user identifier, shared secret data, UTV, etc.) and compare the output with the received legacy transaction formatted data. If the two outputs match, then the user may be verified.

In step 212, a notification message is sent. In some embodiments, the issuer server may utilize an OTA provisioning server to provide an instruction (e.g., a confirmation or notification message) to the point of sale device and/or the reader device to proceed with the electronic transaction (i.e., authorize the electronic transaction at the point of sale). In one embodiment, the issuer server or the OTA provisioning server may, after verifying the user, validate the account of the user by querying an account server that manages the user's account (e.g., a credit card account, a loyalty card account, etc.) prior to sending the notification message.

In step 214, the electronic transaction is conducted. In some embodiments, The POS reader device may then conduct/complete the electronic transaction upon receipt of the notification message.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for conducting an electronic transaction, the method comprising:

establishing by a mobile application in a mobile device upon an initial use of the mobile application, a shared secret with an issuer server via a cellular network or Internet network;

initiating an electronic transaction between the mobile device and a point of sale (POS) reader device over a wireless connection via the mobile application that is configured to be selected and launched on the mobile device after the mobile device establishes the wireless connection with the POS reader device when positioned in close proximity to the POS reader device;

applying both a consumer personal device identifier that identifies the mobile device and shared secret data as inputs to a cryptographic function in the mobile device, such that the consumer personal device identifier and the shared secret data are encrypted by the cryptographic function, wherein the shared secret data is a key or password shared by both the mobile device and an issuer server;

generating, by the mobile device, the output of the cryptographic function that is formatted as legacy transaction formatted data, wherein the legacy transaction formatted data includes a user identifier that is unencrypted;

wirelessly providing, by the mobile device, the legacy transaction formatted data to the POS reader device via the electronic transaction;

forwarding, from the POS reader device, the legacy transaction formatted data to the issuer server;

processing, at the issuer server, the legacy transaction formatted data to verify the user identifier and authorize the electronic transaction, wherein processing the legacy transaction formatted data includes, by the issuer server, using the user identifier to access a shared secret database in the issuer server to obtain a local copy of the shared secret data, decrypting the encrypted consumer personal device identifier included in the legacy transaction formatted data using the local copy of the shared secret data, and verifying, by the issuer server, an identity of a user associated with the user identifier by determining that the decrypted consumer personal device identifier matches stored information in the issuer server that is associated with the user;

querying, by the issuer server, an account server to determine if payment card credentials associated with the user and locally stored at the account server are valid after the identity of the user is verified;

in response to determining that the payment card credentials are valid, sending, by the issuer server to the POS reader device, a notification message that authorizes the electronic transaction; and conducting, at the POS reader device, the electronic transaction upon receipt of the notification message.

2. The method of claim 1 wherein the legacy transaction formatted data includes at least one of: Track 1 data, Track 2 data, Track 3 data, and EMV data.

3. The method of claim 1 wherein the electronic transaction includes an electronic payment transaction or an electronic non-payment transaction.

4. The method of claim 1 wherein the cryptographic function is at least one of: a one way function, a cryptographic hash function, a standard encryption function, and proprietary encryption function.

5. The method of claim 1 wherein the mobile device includes a near field communications (NFC) enabled mobile device.

6. The method of claim 1 wherein the mobile device is equipped with at least one of: a Quick Response (QR) code reader, a barcode reader, a camera, a WiFi enabling chip, and another wireless technology enabling chip.

7. The method of claim 1 wherein the electronic transaction is conducted in a magnetic stripe based network or a Europay, MasterCard, and Visa (EMV) card based network.

8. The method of claim 1 wherein the POS reader device is either located at a fixed location or comprises a mobile POS reader device.

9. The method of claim 1 wherein the user identifier is mapped to a mobile device identifier or a subscriber identity module (SIM) identifier.

10. The method of claim 9 wherein the mobile device identifier includes a serial number or an international mobile equipment identity (IMEI) number.

11. The method of claim 1 wherein the cryptographic function is generated using at least one of: an account number, the user identifier, a password, a subscriber identity module (SIM) identifier, an employer identification number (EIN), a WIN, an international mobile equipment identity (IMEI) number, biometric data, a sequence number, a random number, and a unique transaction identifier.

12. The method of claim 1 wherein the shared secret data includes at least one of: a password, a public key, and a shared key.

13. The method of claim 1 wherein the shared secret data includes a combination of a password and biometric data.

14. The method of claim 1 wherein the user identifier is linked to an application account that is used to facilitate the electronic transaction.

15. The method of claim 1 wherein the user identifier is linked to card credentials stored in the issuer server.

16. The method of claim 15 wherein the card credentials includes magnetic stripe data or Europay, MasterCard, and Visa (EMV) payment card data.

17. The method of claim 1 wherein a bank identifier number (BIN) is added to the output of the cryptographic function to form Track 1 and Track 2 data and is used to route the Track 1 and Track 2 data to the issuer server over an existing POS, payment, or non-payment network infrastructure.

18. A system for conducting an electronic transaction, the system comprising:
a point of sale (POS) reader device located a point of sale that is configured to process an electronic transaction;
a mobile device that includes a mobile application that establishes upon an initial use of the mobile application, a shared secret with an issuer server via a cellular network or Internet network, wherein the mobile device is configured to initiate the electronic transaction over a wireless connection with the POS reader device via a mobile application that is configured to be selected and launched on the mobile device after the mobile device establishes the wireless connection with the POS reader device when positioned in close proximity to the POS reader device, to apply both consumer personal device identifier that identifies the mobile device and shared secret data as inputs to a cryptographic function in the mobile device, such that the consumer personal device identifier and the shared secret data are encrypted by the cryptographic function, wherein the shared secret data is a key or password shared by both the mobile device and an issuer server, to generate the output of the cryptographic function that is formatted as legacy transaction formatted data, wherein the legacy transaction formatted data includes a user identifier that is unencrypted, and to wirelessly provide the legacy transaction formatted data to the POS reader device via the electronic transaction; and
an issuer server configured to receive the legacy transaction formatted data from the POS reader device, to process the legacy transaction formatted data to verify the user identifier and to authorize the electronic transaction by using the user identifier to access a shared secret database in the issuer server to obtain a local copy of the shared secret data, decrypting the encrypted consumer personal device identifier included in the legacy transaction formatted data using the local copy of the shared secret data, and verifying an identity of a user associated with the user identifier by determining that the decrypted consumer personal device identifier matches stored information in the issuer server that is associated with the user, to query an account server to determine if validating payment card credentials associated with the user and locally stored at the account server are valid after the identity of the user is verified, and, and in response to determining that the payment card credentials are valid, sending a notification message to the POS reader device that authorizes the electronic transaction.

19. A non-transitory computer readable medium having stored thereon executable instructions for controlling a computer to perform steps comprising:
establishing by a mobile application in a mobile device upon an initial use of the mobile application, a shared secret with an issuer server via a cellular network or Internet network;
initiating an electronic transaction between the mobile device and a point of sale (POS) reader device over a wireless connection via the mobile application that is configured to be selected and launched on the mobile device after the mobile device establishes the wireless connection with the POS reader device when positioned in close proximity to the POS reader device;
applying a consumer personal device identifier that is associated the mobile device and shared secret data as inputs to a cryptographic function in the mobile device, such that the consumer personal device identifier and the shared secret data are encrypted by the cryptographic function, wherein the shared secret data is a key or password shared by both the mobile device and an issuer server;
generating, by the mobile device, the output of the cryptographic function that is formatted as legacy transaction formatted data, wherein the legacy transaction formatted data includes a user identifier that is unencrypted;
wirelessly providing, by the mobile device, the legacy transaction formatted data to the POS reader device via the electronic transaction;
forwarding, from the POS reader device, the legacy transaction formatted data to the issuer server;
processing, at the issuer server, the legacy transaction formatted data to verify the user identifier and authorize the electronic transaction, wherein processing the legacy transaction formatted data includes, by the issuer server, using the user identifier to access a shared secret database in the issuer server to obtain a local copy of the shared secret data, decrypting the encrypted consumer personal device identifier included in the legacy transaction formatted data using the local copy of the shared secret data, and verifying, by the issuer server, an identity of a user associated with the user identifier by determining that the decrypted consumer personal device identifier matches stored information in the issuer server that is associated with the user;

querying, by the issuer server, an account server to determine if payment card credentials associated with the user and locally stored at the account server are valid after the identity of the user is verified;

in response to determining that the payment card credentials are valid, sending, by the issuer server to the POS reader device, a notification message that authorizes the electronic transaction; and conducting, at the POS reader device, the electronic transaction upon receipt of the notification message.

* * * * *